Nov. 24, 1925.

C. F. BRAUN

CONDENSER

Filed June 29, 1921

Inventor
Carl F. Braun
By Chas. E. Townsend
Attorney

Patented Nov. 24, 1925.

1,562,682

UNITED STATES PATENT OFFICE.

CARL F. BRAUN, OF SAN FRANCISCO, CALIFORNIA.

CONDENSER.

Application filed June 29, 1921. Serial No. 481,287.

*To all whom it may concern:*

Be it known that I, CARL F. BRAUN, a citizen of the United States, residing at San Francisco, in the county of San Francisco and State of California, have invented new and useful Improvements in Condensers, of which the following is a specification.

This invention relates to fluid condensers, heat exchangers and the like, of the general design disclosed in my Patents Nos. 1,442,-783 and 1,376,135, issued to me January 22, 1923 and April 26, 1921, respectively.

In many commercial processes requiring the condensation and cooling of vapors, such, for example, as the condensation of vapors incident to oil refining, it has been found highly desirable that the condensate and any fixed or non-condensible gases which are treated should be reduced to a minimum temperature in order to obtain maximum condensation. It has also proven desirable to require the vapors including the condensate and fixed gases, if any, to pass without separation through the apparatus so that full benefit may be obtained from the absorption effect. That is, the condensation of certain vapors in contact with other constituents the vapors by themselves being non-condensible. Such a process is carried out to best advantage in an apparatus which increases the turbulency of the fluids with resultant acceleration of heat transfer thus permitting the use of a minimum amount of actual cooling surface. The foregoing desirable results have heretofore been rarely obtained in commercial heat exchangers and condensers, due to the fact that the fluids are not compelled to remain in intimate contact with the cooling surfaces during their transit through the apparatus, the materials stratify within the apparatus, and the liquid objectionably collects to minimize the absorption effect thereof. It is the principal object of the present invention, therefore, to provide an apparatus for condensing vapors and fluids which will tend to retard the flow of the material sufficiently to subject it to the maximum cooling effect of the apparatus, will produce a uniform distribution of the entering fluids to insure a maximum absorption and a thorough condensation of all but the fixed gases, all of which results are obtained in an apparatus comparatively simple in its construction and far more economical as to installation and operating costs than most condensers now on the market; and in addition, will insure that a maximum cooling effect may be obtained by alternate increase and decrease of fluid velocities with resulting turbulence and a maximum separation of associated fluids.

The present invention contemplates the use of a tubular shell, within which a longitudinal nest of tubes is mounted, one end of said nest being fixed by its tube sheet relative to the shell, and the other end having a yieldable partition whereby separate currents of a cooling solution and fluids to be condensed may be obtained through and around the tubes, said shell being formed with an annular vapor receiving chamber adapted to project incoming fluid against the end of the shell, thereafter allowing it to pass to the opposite end of the shell as it travels around the tubes and is uniformly distributed due to intermediate baffle plates. The tubes are further fitted with baffles acting to increase the turbulence of the liquids passing through the tubes.

The invention is illustrated by way of example in the accompanying drawings, in which.

Figures 1, 2:
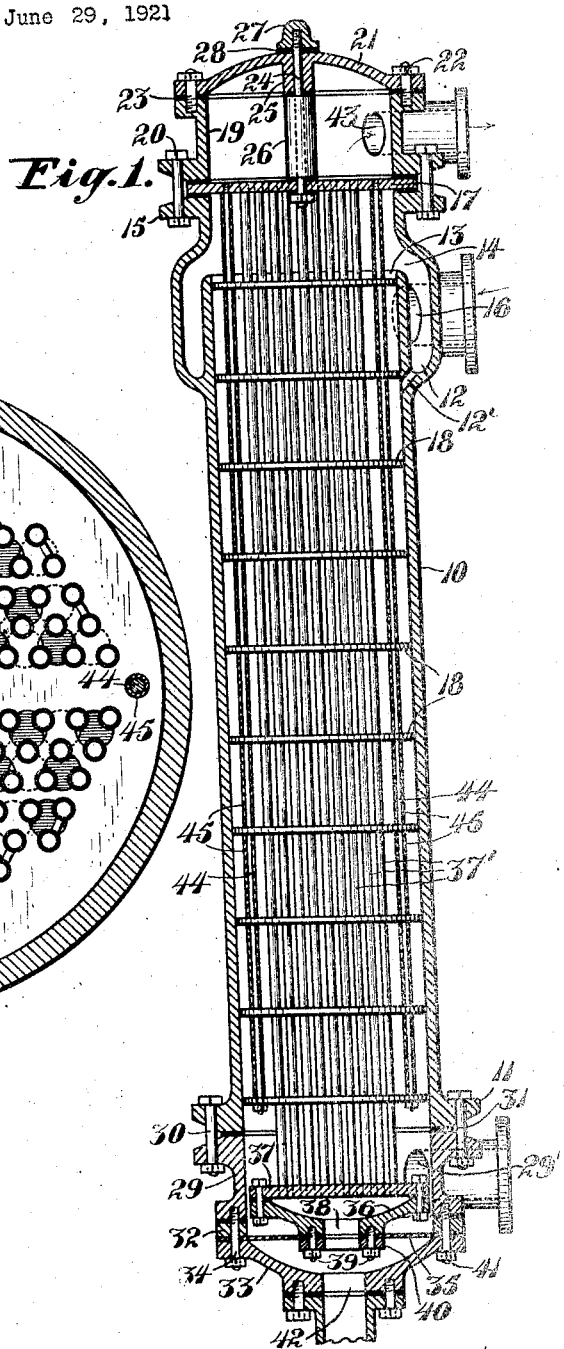
Fig. 1 is a view in central longitudinal section through a heat exchanger, with which the present invention is concerned.
Fig. 2 is an enlarged view in transverse section through the heat exchanger showing the means provided for obtaining turbulence of the medium being cooled.

Referring more particularly to the drawings, 10 indicates a tubular shell, one end of which is fitted with a bolting flange as indicated at 11. The opposite end of the shell is formed with a vapor inlet jacket 12, which surrounds the mouth 13 of the shell and communicates therewith through a throat 14 at the end of the shell. A continuation of this jacket wall is reduced in diameter to agree with that of the main body of the shell, and is formed with a bolting flange 15, similar to the flange 11 at the opposite end of the shell. A vapor inlet passageway 16 is formed through the wall of the inlet jacket and directs the incoming vapor against the extending end of the shell, after which it will pass through the throat 14 against a fixed tube sheet 17, thereafter to be directed longitudinally of the shell 10 and against and through the various baffle plates 18.

The tube sheet 17 is interposed between the end of the shell and a cylindrical dome casting 19, which is fitted with a bolting flange, by which it may be secured to the flange 15 by bolts 20. The outer or upper end of this casting is provided with a convexed cover plate 21 secured to the casting by stud bolts 22. A packing gasket 23 is interposed between the cover plate and the end of the casting. A center stay bolt 24 extends through a boss 25 in the cover 21 and the tube sheet 17. A spacing sleeve 26 is interposed between the end of the boss and the tube sheet and is held in position by a nut 27 which is tightened on to the outer end of the stay bolt. Suitable packing gaskets 28 are interposed between the various joints along the stay bolt.

The opposite or lower bolting flange 11 receives a cylindrical casting 29 which is fitted with a suitable bolting flange, by which it is held to the flange 11 by bolts 30. This casting is fitted with a condensate outlet 29'. A suitable gasket 31 is interposed between the adjacent faces of the shell and the casting. The outer end of the casting 29 receives an annular spacing ring 32 against which a dome cap 33 is bolted by members 34. Interposed between the filler ring 32 and the dome cap 33 is a metal diaphragm 35. This diaphragm is perforated near its marginal edge to receive the bolts 34 by which it is anchored in position.

A diaphragm 35 made of relatively thin metal provides a yieldable partition across the end of the shell and separates the main cylindrical body of the shell from the dome cap 33. By reference to the drawings it will be seen that the diaphragm is of relatively large area and is secured within the shell without requiring that the shell be enlarged by reason of the fact that the dome 36 is secured to the diaphragm near its center. This cap closes the end of the shell and is bolted against the outer face of the diaphragm 35. The interior of this dome is concaved, the concave portion being of a diameter equal to the interior diameter of the shell and thus providing a flat annular face which is held against the shell by bolts 34 which pass through the annular flange on the dome, as well as a filler ring 32 and are then secured to the end of the member 29 which forms a continuation of the shell. The filler ring 32 has an interior diameter agreeing with the interior diameter 29 of the shell and thus it will be seen that the diaphragm 35 will be gripped along its circumferential edge and the main body of it will be free to flex. An opening is formed through the center of the diaphragm of sufficient area to accommodate a flow of fluid through all of the tubes 37'. A dome member 36 is bolted around the central opening in the diaphragm and is in turn bolted to the lower tube sheet 37 along its outer circumferential face. This dome has a central opening 38 in direct vertical alignment with the opening through the center of the diaphragm and the diaphragm is held to the center of the dome by bolts 39 and a ring 40 fastened by the bolts beneath the diaphragm and acted upon by the bolts to clamp the diaphragm along the portion directly adjacent its central opening against an annular face of the dome 36.

Attention is directed to the fact that the tube sheet 37 at the bottom of the tube as well as the dome 36 are of smaller diameter than the interior of the shell, thus making it possible for these members to expand and contract due to variations in temperature without throwing any undue stress on any of the parts and without causing leakage between any of the parts. This is accomplished by the supporting and aligning action of the yieldable diaphragm 35. It will also be evident that due to the large expanse of metal in the diaphragm between the concentric annular surfaces by which it is clamped near the center and near its outer edge the diaphragm may have a maximum flexure without restraint. The dome cap 33 forming the end closure for the shell has a central opening 42 which is here shown as in vertical alignment with the opening 38 through the dome 36 of the tube sheet and the central opening in the diaphragm, thus permitting the fluid to flow directly from the tubes through the sheet 37 and the diaphragm and then out through the bottom of the shell. The concave formation of the dome cap 33 will also afford unlimited expansion of the members and provide them room for movement. This method of forming a partition between the shell and the tube fluid outlet while permitting expansion and contraction of the various members is different from most devices now in use, as all packing is eliminated and by the use of a diaphragm having a single central opening and a large surrounding area of metal which may have unrestricted flexure a maximum contraction and expansion may take place without permitting the leakage of any of the fluid from the shell to reach the fluid passing from the tubes.

The water inlet opening 42 is formed through the end of the cover plate 33 and is in register with the opening 38 through the dome member 36 and the diaphragm. It is to be understood that a water outlet opening 43 is provided through the casting 19 at the opposite end of the shell. The tube unit may be formed as desired, although it is preferable to build it up of a plurality of tubes secured in the opposite sheets 17 and 37 and extending through baffle plates 18. These plates are of the general character indicated in my Patents Nos. 1,442,783 and 1,376,135, issued to me January 22, 1923 and April 26, 1921, respectively. Stay rods 44 pass through the various baffle plates and cooperate with spacing pipes 45 to hold them in proper spaced relation to each other.

In the operation of the present invention the apparatus may be utilized as a heat exchanger by admitting vapor to the shell through the inlet opening 16. This vapor will circulate around the upper part 13 of the shell and will be projected longitudinally of the shell through the throat 14. The vapor will then strike the tube sheet 17 and will be deflected downwardly into the mouth 13 of the shell. Downward flow will be accompanied by equal distribution of the vapor over the baffle plates 18 and through the openings in the baffle plates. Simultaneous with the downward flow of the vapor around the tube, an upward flow of the cooling agent is taking place through the pipe 42, the opening 38 in the diaphragm 35 and the dome 36. This flow will be continued upwardly through the various tubes. When the liquid has reached the upper end of the shell it will pass out at 43.

In utilizing the apparatus here disclosed for the condensation of vapors such as are incident to the oil industry the vapors will be delivered to the upper end of the shell through opening 16 and will thereafter pass upwardly against the tube sheet 17 and thence downwardly through the baffle plates. Due to the arrangement of the jacket 12 and the throat 14, it is insured that the full length of the tubes will be effective. As the vapor passes downwardly the transverse baffle plates will prevent the condensate from cooling and flowing directly down the shell between the outside of the tubes and the shell, thereby insuring that the central tubes will be as effective in their cooling action as the outer tubes. A large number of transverse baffle plates will thus collect condensate to form wetted surfaces of large area, greatly improving the absorption effect produced. The transverse baffle plates will also prevent particles of the condensate from falling free throughout the length of the shell and will intercept these particles so that they will flow in intimate contact with the tube and will pass from the shell with the fixed gases at the point of lowest temperature in the apparatus. As the vapor passes downwardly it will gradually encounter cooler temperatures and of course the condensible vapors of various characters will be liquefied as its respective condensation temperature is reached. This will insure that a maximum condensation of vapor will be produced. Furthermore, the formation of the condenser casing whereby an annular inlet chamber is provided presenting an obstructing wall to the incoming gases will prevent the particles of entrained liquid from being directly projected against the tube surfaces with a resulting erosive action, and at the same time will have the effect of condensing a portion of the entrained liquid upon this wall so that it will drain into the casing in a liquefied form through the discharge passage 12'.

Having thus described my invention, what I claim and desire to secure by Letters Patent is:

1. A heat exchanger comprising a shell having an inlet and an outlet through which a fluid may flow, a tube unit within said shell, a rigid mounting for one end of said tube unit, a dome shaped member secured to the other end of the tube unit and having an aperture therein disposed in the line of flow of the fluid through the tube unit, and a yieldable member having its central part connected to the dome shaped member and its outer edge connected to the shell for the yieldable support of said second mentioned end of the tube unit.

2. A heat exchanger comprising a tubular shell through which an end to end flow of fluid may occur, a tube unit extending through said shell through which another fluid may flow in a direction opposite to the direction of the other flow of fluid, an outlet dome at one end of the shell, said dome being separated from the shell by one of the tube sheets of the tube unit, an inlet dome at the opposite end of the shell, another dome connected to the lowermost tube sheet and disposed within the inlet dome, and a diaphragm having connection at its outer edge with said inlet dome and connected near its center to the dome within the inlet dome to yieldably support the lower end of the tube unit within the shell.

CARL F. BRAUN.